3,012,859
BORON TRIFLUORIDE RECOVERY
Harmon Madison Knight, La Marque, and Joe T. Kelly, Dickinson, Tex., assignors, by mesne assignments, to Standard Oil Company, Chicago, Ill., a corporation of Indiana
No Drawing. Filed June 17, 1958, Ser. No. 742,501
3 Claims. (Cl. 23—205)

This invention relates to the release of boron trifluoride from water-containing $BF_3$-complexes. More particularly, the invention relates to release of $BF_3$ from $BF_3$-hydrates.

The complex of water and $BF_3$ known as $BF_3$-hydrate is an efficient catalyst for many reactions. This catalyst is a relatively expensive catalyst and economic usage thereof requires reuse of the catalyst. In all reactions there is a build-up of organic material which eventually reduces the catalyst to an inactive state. The inactive catalyst is usually discarded because present procedures make it uneconomic to recover the $BF_3$ content.

Another catalyst of considerable interest in hydrocarbon conversions is a complex between $BF_3$ and metal salt hydrates. These complexes generally contain 1 mole of $BF_3$ per mole of water of hydration. Once again it is very difficult and an expensive proposition to release the $BF_3$ from its complex and then recover the released $BF_3$ in a useable form.

An object of the invention is a method of releasing $BF_3$ from its complexes with water, particularly, $BF_3$-hydrate and metal salt hydrate-$BF_3$ complex. A particular object is a method of recovering $BF_3$ from spent catalyst containing $BF_3$ and water complexed with said $BF_3$. Other objects will become apparent in the course of the detailed description.

It has been discovered that $BF_3$ is displaced from a $BF_3$-complex containing water by fluosulfonic acid. The released $BF_3$ passes out of the complex containing zone in its natural state of a gas. The released $BF_3$ may be readily recovered and used to prepare fresh complex.

The method of this invention is applicable to any complex which contains both $BF_3$ and water; it appears that in such complexes the $BF_3$ is associated with the water and it is this association which must be broken in order to release the $BF_3$ in the form of a gas. The method is particularly applicable to that form of $BF_3$ and water complex known as $BF_3$ hydrate. The invention is applicable to either the $BF_3$ monohydrate consisting of 1 mole of $BF_3$ per mole of water or the $BF_3$ dihydrate consisting of 1 mole of $BF_3$ per 2 moles of water. The method may be applied to the fresh $BF_3$-hydrate or it may be applied to $BF_3$ hydrate which has been used as a catalyst until its catalytic powers have been lost, for example, a spent catalyst from the alkylation of benzene or toluene with diisobutylene using $BF_3$ monohydrate catalyst.

Another complex to which the method is particularly applicable consists of a complex formed between $BF_3$ and a metal salt containing water of hydration. Examples of metal salt hydrates which form such complexes with $BF_3$ are: ferrous pyrophosphate hydrate, nickel phosphate hydrate, aluminum pyrophosphate hydrate, etc. These complexes are solids at ordinary temperatures. When disassociated by heating to about the decomposition temperature of the hydrate the $BF_3$ is released in the form of a $BF_3$-hydrate complex. The method of the invention is applicable to either the metal salt hydrate-$BF_3$ complex as such or to complexes which have become spent in catalytic operations. For example, ferric pyrophosphate hydrate-$BF_3$ complex spent due to formation of a gummy coating thereon during the reaction of ethylene and isobutane to form gasoline boiling range hydrocarbons.

It is to be understood that the above specific embodiments of $BF_3$ complexes containing water do not limit the scope of the invention and the method is applicable to any $BF_3$-complex containing water.

In the method of the invention the water containing $BF_3$-complex is contacted with a fluosulfonic acid. Apparently, the fluosulfonic acid forms a more stable complex with water than does $BF_3$ because $BF_3$ is released from the complex in the form of gas. In order to release substantially all of the $BF_3$ present in the complex at least about 1 mole of fluosulfonic acid must be used per mole of $H_2O$ present in the release zone. It is preferred to use an excess of fluosulfonic acid in order to speed up the release reaction. This is particularly true when releasing $BF_3$ from $BF_3$-hydrate. In general, it is preferred to use between 1.2 and 1.5 moles of fluosulfonic acid per mole of water in said hydrate.

The release reaction is carried out at temperatures between about 50° F. and 200° F. When it is desired to speed up the reaction it is preferred to operate at more elevated temperatures such as between about 130° F. and 170° F. The release reaction is carried out at normal pressure; however, higher pressures may be used when it is desired to minimize the amount of water taken overhead with the released $BF_3$.

The release reaction is carried out for a time sufficient to release all of the $BF_3$ theoretical releasable with the particular amount of fluosulfonic acid charged. When operating with the preferred amounts of fluosulfonic acid substantially all the $BF_3$ can be released and the reaction is carried out for the time needed to release substantially all the $BF_3$ present in the complex.

The method of the invention is illustrated by the following working examples:

Examples 1–2

These tests were made in a 500 ml. stirred Pyrex reactor in the following manner. Boron trifluoride monohydrate (175 g.) was charged to the reactor. A mild vacuum was pulled through the scrubber system, which consisted of an off-gas line from the top of the reactor to a trap, a series of three water scrubbers, then finally a calcium sulfate drier attached to a vacuum line. The stirrer was started, then fluosulfonic acid was added at such a rate that the scrubbing system would remove the $BF_3$ liberated from the complex. At the end of the run, the contents of the scrubbers were combined and analyzed for boron and sulfur.

Complete data for two runs are shown below where the results are based on boron analyses of aqueous solutions.

| Example | 1 | 2 |
|---|---|---|
| Run Conditions: | | |
| Temperature (° F.) | 65–74 | 140–160 |
| Time, Total (minutes) | 75 | 75 |
| $FSA/BF_3$ (molar) | 1.3 | 1.3 |
| Mode of Operation: | | |
| Heat Added | No | Yes |
| Stripping Used | No | Yes |
| Run Data: | | |
| $BF_3$ in Complex (g.) | 134.7 | 138.1 |
| $BF_3$ Liberated (g.) | 74.5 | 132.2 |
| $BF_3$ Remaining in Reactor (g.) | 54.7 | 9.2 |
| $BF_3$ Accounted For (g.) | 129.2 | 141.4 |
| Percent $BF_3$ Balance | 96 | 102 |
| Percent $BF_3$ Recovered | 57.7 | 93.5 |

Example 3

In this example a complex consisting of ferric pyrophosphate containing 9 moles of water of hydration per mole of pyrophosphate and 9 moles of $BF_3$ per mole of pyrophosphate was contacted with fluosulfonic acid in a Pyrex glass vessel. Large quantities of a white gas were released which gas was adsorbed in water. Analyses of the water solution showed the gas adsorbed to be boron trifluoride.

Thus having described the invention, what is claimed is:

1. A method of recovering $BF_3$ from a complex consisting of $BF_3$ and ferric pyrophosphate hydrate which method comprises contacting said complex with at least about one mole of fluosulfonic acid per mole of $BF_3$ in said complex, at a temperature between about 50° F. and 200° F., for a time sufficient to release substantially all of the $BF_3$ present and recovering the $BF_3$ so released.

2. The method of claim 1 wherein said acid usage is between about 1.2 and 1.5 moles per mole of $BF_3$ present.

3. The method of claim 1 wherein said temperature is between about 130° F. and 170° F.

References Cited in the file of this patent
UNITED STATES PATENTS

| | | |
|---|---|---|
| 2,416,133 | Young et al. | Feb. 18, 1947 |
| 2,628,991 | Schneider et al. | Feb. 17, 1953 |
| 2,805,982 | Swinehart et al. | Sept. 10, 1957 |

OTHER REFERENCES

Booth: "Boron Trifluoride and Its Derivatives," 1949, page 8.